(12) United States Patent
Druhan et al.

(10) Patent No.: US 9,377,122 B2
(45) Date of Patent: Jun. 28, 2016

(54) FLAPPER ASSEMBLIES FOR TORQUE MOTORS OF ELECTROHYDRAULIC VALVES

(71) Applicant: HONEYWELL INTERNATIONAL INC., Morristown, NJ (US)

(72) Inventors: David T. Druhan, South Bend, IN (US); Nicholas E. Wilson, Three Rivers, MI (US); Sammuel Tillich, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 69 days.

(21) Appl. No.: 14/227,923

(22) Filed: Mar. 27, 2014

(65) Prior Publication Data

US 2015/0276083 A1    Oct. 1, 2015

(51) Int. Cl.
*F16K 1/42*      (2006.01)
*F16K 31/04*     (2006.01)
(Continued)

(52) U.S. Cl.
CPC ............... *F16K 31/041* (2013.01); *F16K 1/42* (2013.01); *F16K 25/005* (2013.01); *F16K 27/048* (2013.01); *F16K 31/0679* (2013.01);
(Continued)

(58) Field of Classification Search
CPC ......... F16K 1/205; F16K 1/36; F16K 1/2014; F16K 25/005; F16K 1/42; F16K 1/427; F16K 1/465; F16K 31/0679; F15B 13/0438; Y10T 137/2278; Y10T 137/86606; Y10T 137/86598; G05D 7/0635
USPC ............. 251/44, 359; 137/82, 625.62, 625.63
See application file for complete search history.

(56) References Cited

U.S. PATENT DOCUMENTS 2,284,627 A    6/1942   Alden
2,852,038 A    9/1958   Holsclaw
(Continued)

FOREIGN PATENT DOCUMENTS

EP       1921327 A1     5/2008
RU      94044284 A1    10/1996
RU     2011134976 A     3/2013

OTHER PUBLICATIONS

USPTO Final Office Action, Notification Date Jul. 1, 2014; U.S. Appl. No. 13/219,121.
(Continued)

*Primary Examiner* — Matthew W Jellett
(74) *Attorney, Agent, or Firm* — Ingrassia Fisher & Lorenz, P.C.

(57) ABSTRACT

Flapper assemblies for torque motors of electrohydraulic valves are provided. The flapper assembly comprises a flapper having an upper end portion configured for coupling to an armature and armature-flapper support of the torque motor and a lower end portion having a socket therein. A hemispherical closure member having a flat diametrical face configured to seal against a nozzle outlet is disposed for oscillatory movement in the socket. A retaining clip is slidably mounted about the lower end portion and has a retention opening exposing the flat diametrical face and sized to retain the hemispherical closure member in the socket. The torque motor comprises the armature coupled to the armature-flapper support, the flapper assembly, and a plurality of coils. The electrohydraulic valve comprises the torque motor and a nozzle configured to be in fluid communication with the flapper assembly when the electrohydraulic valve is in an open position.

17 Claims, 9 Drawing Sheets

(51) Int. Cl.
*F16K 27/04* (2006.01)
*F16K 25/00* (2006.01)
*H02K 26/00* (2006.01)
*F16K 31/06* (2006.01)
*H02K 7/14* (2006.01)

(52) U.S. Cl.
CPC .................. *H02K 7/14* (2013.01); *H02K 26/00* (2013.01); *Y10T 137/2278* (2015.04); *Y10T 137/86614* (2015.04)

(56) References Cited

U.S. PATENT DOCUMENTS

| | | | |
|---|---|---|---|
| 2,962,611 A | 11/1960 | Atchley | |
| 3,029,830 A | 4/1962 | Klover et al. | |
| 3,373,769 A * | 3/1968 | Chaves, Jr. | F02K 9/58 137/595 |
| 3,510,100 A * | 5/1970 | Bokelman | F16K 23/00 251/129.2 |
| 3,570,807 A * | 3/1971 | Sturman | F16K 31/0682 251/129.17 |
| 3,712,339 A | 1/1973 | Bartholomaus et al. | |
| 3,714,610 A | 1/1973 | Duff et al. | |
| 3,777,784 A | 12/1973 | Nicholson | |
| 3,910,314 A | 10/1975 | Nicholson | |
| 4,378,031 A | 3/1983 | Nicholson et al. | |
| 4,527,772 A * | 7/1985 | Kebede | F16K 31/10 137/82 |
| 4,560,969 A | 12/1985 | Nicholson | |
| 4,783,047 A * | 11/1988 | Baltus | F16K 31/0682 251/129.1 |
| 4,794,941 A | 1/1989 | Godon | |
| 4,928,729 A * | 5/1990 | Hornby | F02M 69/54 123/512 |
| 4,997,002 A | 3/1991 | Blatter et al. | |
| 5,031,701 A | 7/1991 | McLelland et al. | |
| 7,428,913 B2 * | 9/2008 | Benson | F16K 1/36 137/487.5 |
| 7,726,340 B2 | 6/2010 | Druhan | |
| 2004/0056048 A1 | 3/2004 | Kaartinen | |
| 2008/0110513 A1 | 5/2008 | Druhan | |
| 2008/0194338 A1 | 8/2008 | Helstern | |
| 2013/0048891 A1 * | 2/2013 | Druhan | F15B 13/0438 251/129.15 |

OTHER PUBLICATIONS

Tran et al., "Design of a Fast Short-Stroke Hydrauic Actuator". Annals of the CIRP, 1994, vol. 43, pp. 469-472.
Garcia-Mendez et al., "XPS and HRTEM Characterization of Cobalt-Nickel Silicide Thin Films". Applied Surface Science, 2000, vol. 161, pp. 61-73.
EP Search Report, EP 12181422.2-2208 dated Dec. 20, 2012.
EP Communication, EP 12181422.2-2208 dated May 2, 2013.
USPTO Office Action, Notification Date Jan. 28, 2014; U.S. Appl. No. 13/219,121.

* cited by examiner ical face configured to engage the nozzle outlet when the electrohydraulic valve is in a closed position. A retaining clip is slidably mounted about the lower end portion of the flapper for retaining the closure member in the socket. The nozzle is configured to be in fluid communication with the flapper assembly when the electrohydraulic valve is in an open position.

FLAPPER ASSEMBLIES FOR TORQUE MOTORS OF ELECTROHYDRAULIC VALVES

TECHNICAL FIELD

The present invention generally relates to electrohydraulic valves, and more particularly relates to flapper assemblies for torque motors of electrohydraulic valves.

BACKGROUND

Electrohydraulic valves (EHVs) operated by a torque motor are widely used in industrial applications. For example, single-stage electrohydraulic valves may be used in myriad systems and environments. One typical system and environment is the fuel control system on-board a jet-powered aircraft. No matter the specific end-use system and environment, single-stage EHVs typically include at least one nozzle that is disposed between a pressurized hydraulic fluid source and a hydraulically controlled load. Pressurized hydraulic fluid flow through the nozzle, and thus to the hydraulically controlled load, may be controlled via the torque motor.

A conventional torque motor that is used with a single-stage EHV includes a plurality of coils, an armature assembly, and a flapper. The coils are controllably energized to control the rotational position of the armature assembly. The flapper is coupled to the armature assembly and extends between the outlet of the nozzle and a flapper stop in the single-stage EHV, defining a "nozzle-flapper assembly." The flapper in the nozzle-flapper assembly is conventionally a steel bar. By controlling the rotational position of the armature assembly, the position of the flapper relative to the nozzle outlet in the nozzle-flapper assembly is controlled and thus fluid pressure and/or flow to the hydraulically controlled device is controlled. When the EHV is used as a shut-off valve, the flapper is held against the nozzle outlet in a closed position to prevent flow of the pressurized hydraulic fluid therefrom to the hydraulically controlled device. When the flapper is off the nozzle outlet, the EHV is in an open position, permitting flow of the pressurized hydraulic flow.

Conventional nozzle-flapper assemblies exhibit limited life and excessive leakage between the flapper and the nozzle outlets even in the closed position due to wear of the flapper and/or nozzles in high vibration environments. Over time, the leakage increases as the wear increases.

Hence, there is a need for flapper assemblies for torque motors of electrohydraulic valves. In particular, there is a need for flapper assemblies that may be used in nozzle-flapper assemblies of torque motors of electrohydraulic valves, that exhibit relatively less leakage and extended operating life, and that are relatively inexpensive to manufacture. The present invention addresses at least these needs.

BRIEF SUMMARY

Electrohydraulic valves are provided. In accordance with one exemplary embodiment, the electrohydraulic valve comprises a nozzle having a nozzle outlet and a torque motor. The torque motor comprises a plurality of coils, an armature coupled to an armature-flapper support, and a flapper assembly. The flapper assembly comprises a flapper having an upper end portion coupled to the armature and armature-flapper support, and a lower end portion extending between the nozzle and a flapper stop. The lower end portion includes a socket therein. A hemispherical closure member is disposed for oscillatory movement in the socket and has a flat diametrical face configured to engage the nozzle outlet when the Torque motors for electrohydraulic valves are provided in accordance with yet another exemplary embodiment of the present invention. A torque motor comprises an armature coupled to an armature-flapper support, a flapper assembly, and a plurality of coils. Each coil surrounds a respective portion of the armature. The flapper assembly comprises a flapper having an upper end portion coupled to the armature and armature-flapper support and having a lower end portion extending between a nozzle and a flapper stop. The lower end portion includes a socket therein. A hemispherical closure member is disposed for oscillatory movement in the socket and has a flat diametrical face configured to engage a nozzle outlet when the electrohydraulic valve is in a closed (engine run) position. A retaining clip is slidably mounted about the lower end portion of the flapper for retaining the hemispherical closure member in the socket.

Flapper assemblies for torque motors of electrohydraulic valves are provided in accordance with another exemplary embodiment of the present invention. The flapper assembly comprises a flapper having an upper end portion configured for coupling to an armature and armature-flapper support of the torque motor and a lower end portion having a socket therein. A hemispherical closure member is disposed for oscillatory movement in the socket and has a flat diametrical face configured to seal against a nozzle outlet. A retaining clip is slidably mounted about the lower end portion of the flapper and has a retention opening exposing the flat diametrical face and sized to retain the hemispherical closure member in the socket.

Furthermore, other desirable features and characteristics of the electrohydraulic valves, torque motors, and flapper assemblies will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to flapper assemblies for torque motors of electrohydraulic valves. The flapper assemblies according to exemplary embodiments of the present invention as herein described have improved wear resistance and provide improved nozzle to flapper alignment, thereby reducing vibrational wear-induced leakage and extending their operating life relative to conventional flappers and nozzle-flapper assemblies, thereby also extending the operating life and performance of torque motors of electrohydraulic valves.

Figure 1:
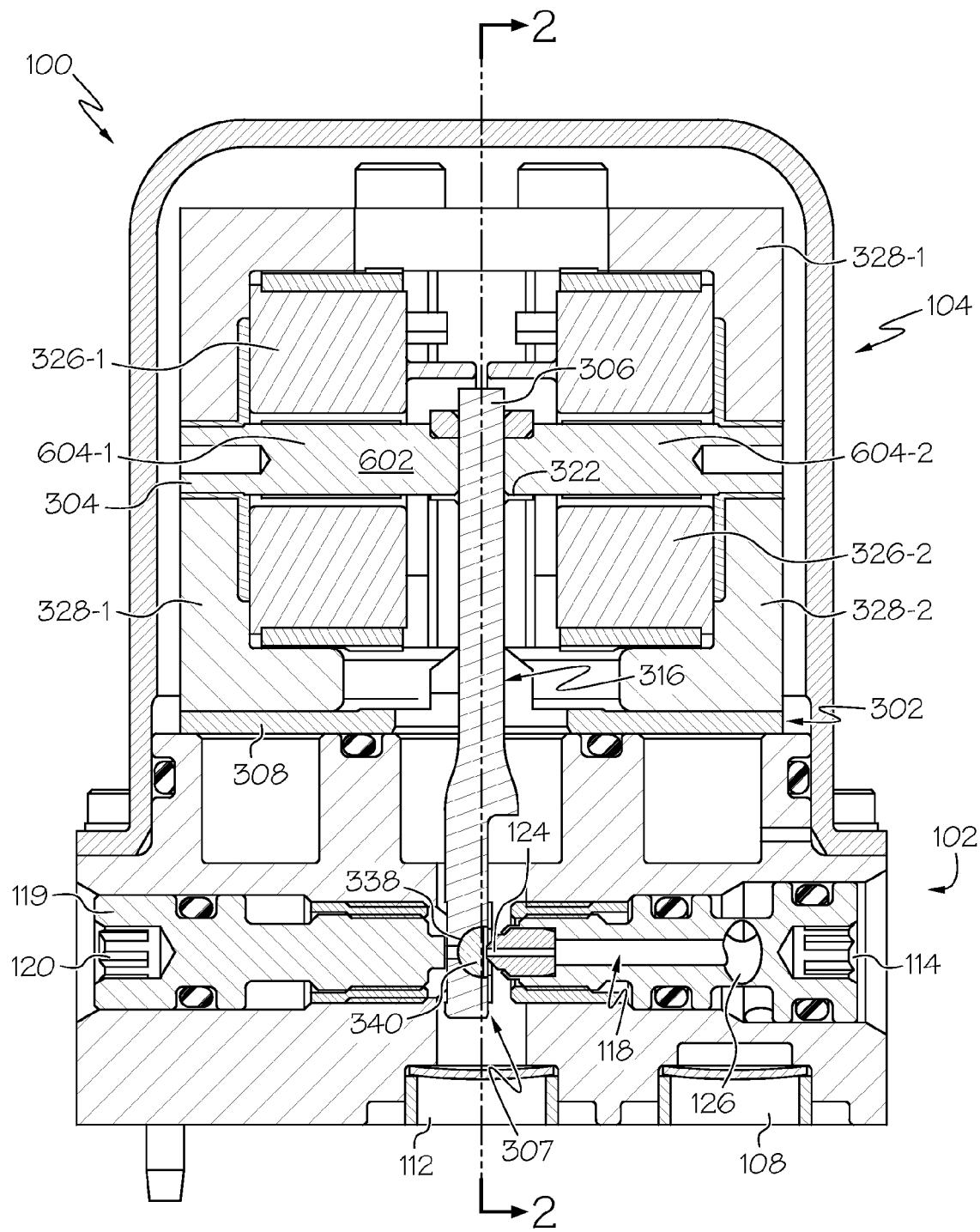
FIG. 1 is a cross-sectional view of an exemplary embodiment of a single-stage electrohydraulic valve taken along line 1-1 of FIG. 2, the single-stage electrohydraulic valve including a torque motor with a flapper assembly according to exemplary embodiments of the present invention.
Figure 2:
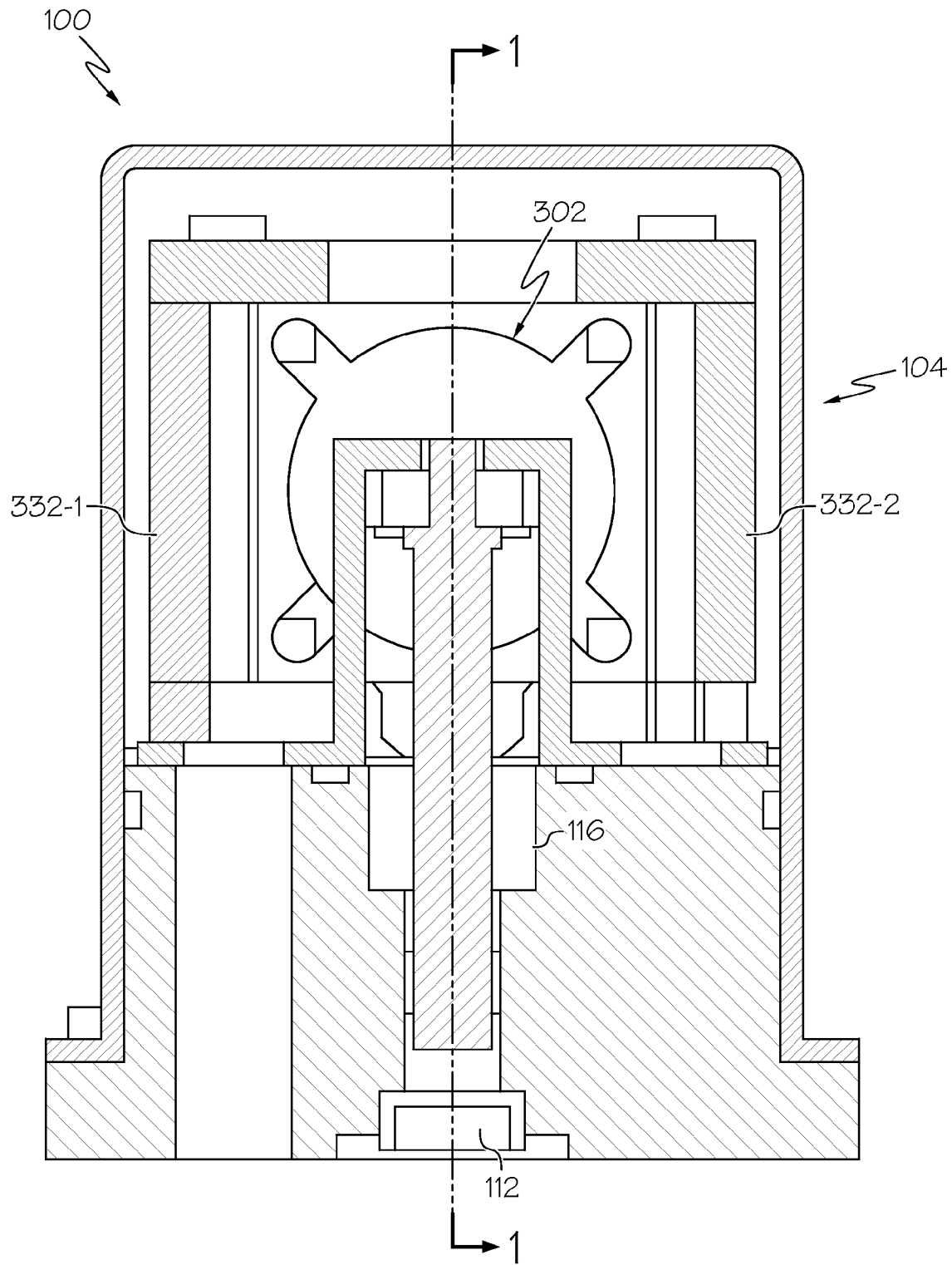
FIG. 2 is a cross-sectional view of the single-stage electrohydraulic valve of FIG. 1 taken along line 2-2 of FIG. 1.
Figure 3:
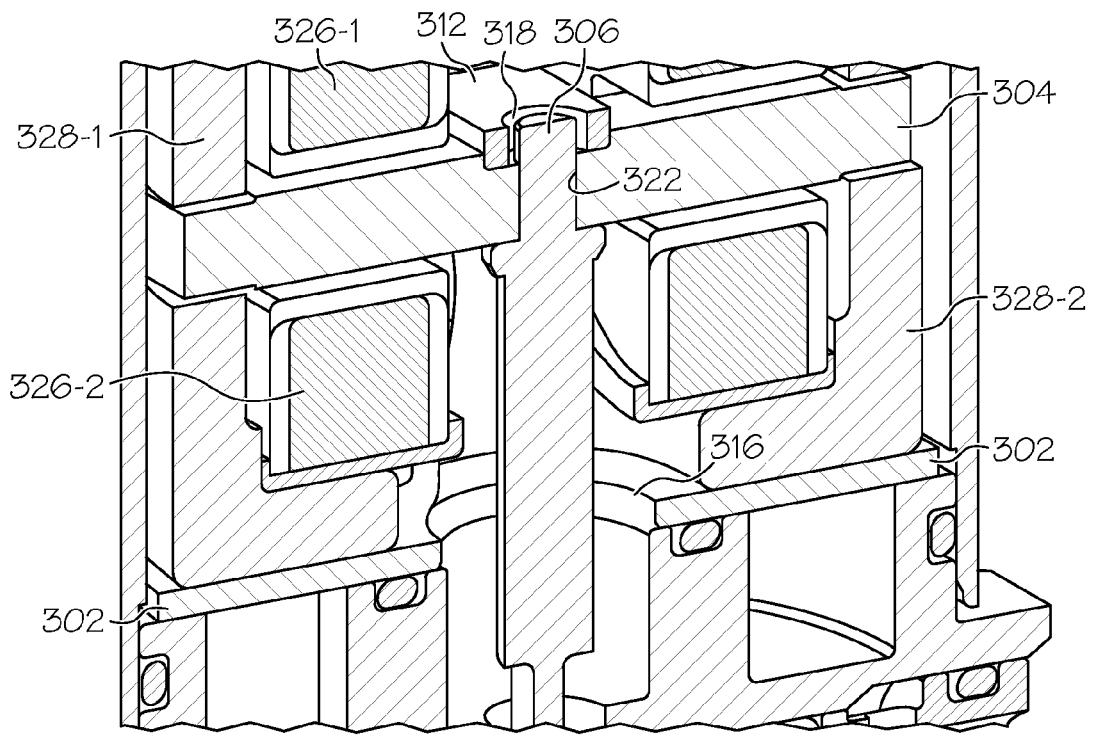
FIGS. 3 and 4 are close-up, cross section plan views of portions of the single-stage electrohydraulic valve depicted in FIGS. 1 and 2, depicting portions of the torque motor in more detail.

Referring now to FIGS. 1 and 2, different cross section views of one embodiment of a single-stage electrohydraulic valve (EHV) 100 are depicted. The depicted EHV includes a housing 102 and a torque motor 104. The housing 102 includes a housing inlet 108, and a housing outlet 112. The housing inlet 108 is adapted to be coupled in fluid communication with a pressurized fluid source (not illustrated). It will be appreciated that the pressurized fluid medium may vary, and may be any one of numerous gaseous or liquid media. The housing outlet 112 is adapted to be coupled in fluid communication with a pressurized fluid load, such as, for example, a pneumatic or hydraulic valve.

The nozzle 118 and a flapper stop 119 are mounted within the housing 102. More specifically, the nozzle 118 is mounted within a nozzle cavity 114, and the flapper stop 119 is mounted within a flapper stop cavity 120. The nozzle 118 includes a nozzle inlet 126 and a nozzle outlet 124. The nozzle 118 is configured such that the housing inlet 108 is in fluid communication with the nozzle inlet 126, and the nozzle outlet 124 is disposed within a flapper plenum 116. The flapper stop 119 is configured to be positioned rearwardly of the flapper within the flapper plenum 116. As will be described momentarily, fluid flow through the nozzle 118 into the flapper plenum 116, and out the housing outlet 112 when the electrohydraulic valve is in the open position is controlled via the torque motor 104, an embodiment of which will now be described.

The torque motor 104 is coupled to the housing 102 and is adapted to be selectively energized. The torque motor 104 is configured, upon being selectively energized, to selectively place the housing outlet 112 in fluid communication with the nozzle outlet 124. In the depicted embodiment, the torque motor 104 includes an armature support 302, an armature 304, and a flapper 306. Still referring to FIGS. 1 and 2 and now to FIGS. 3 through 6, the armature support 302 includes a base 308, an armature-flapper support 312, and a plurality of springs 314. The base 308 has a first flapper opening 316 formed therein, and the armature-flapper support 312, which is spaced apart from the base 308, has a second flapper opening 318 formed therein. The springs 314, which in the depicted embodiment include a first spring 314-1 and a second spring 314-2 (FIG. 5), are coupled between the base 308 and the armature-flapper support 312. Although the springs 314 may be variously implemented, in the depicted embodiment the springs 314 are implemented using beam springs.

The armature 304 is coupled to the armature-flapper support 312 and has a third flapper opening 322 formed therein. Although the armature 304 may be variously configured, in the depicted embodiment, and as shown most clearly in FIG. 6, the armature 304 includes a central portion 602, a first arm 604-1, and a second arm 604-2. The central portion 602 has the third flapper opening 322 formed therein, and the first and second arms 604-1, 604-2 extend from the central portion 602 in opposite directions, and are disposed perpendicular to the flapper 306. The armature 304 is preferably formed of any one of numerous magnetically permeable materials.

The flapper 306 is coupled to the armature-flapper support 312 and to the armature 304. The flapper 306 extends at least partially into the second flapper opening 318. The flapper 306 also extends through the first and third flapper openings 316, 322, and into the flapper plenum 116 between the nozzle 118 and the flapper stop 119 (see FIG. 1). To prevent fluid within the EHV housing 102 from leaking past the flapper 306 and into other portions of the torque motor 104, the torque motor 104 also includes a seal 324 that surrounds a portion of the flapper. The flapper may be comprised of a steel material.

Figure 4:
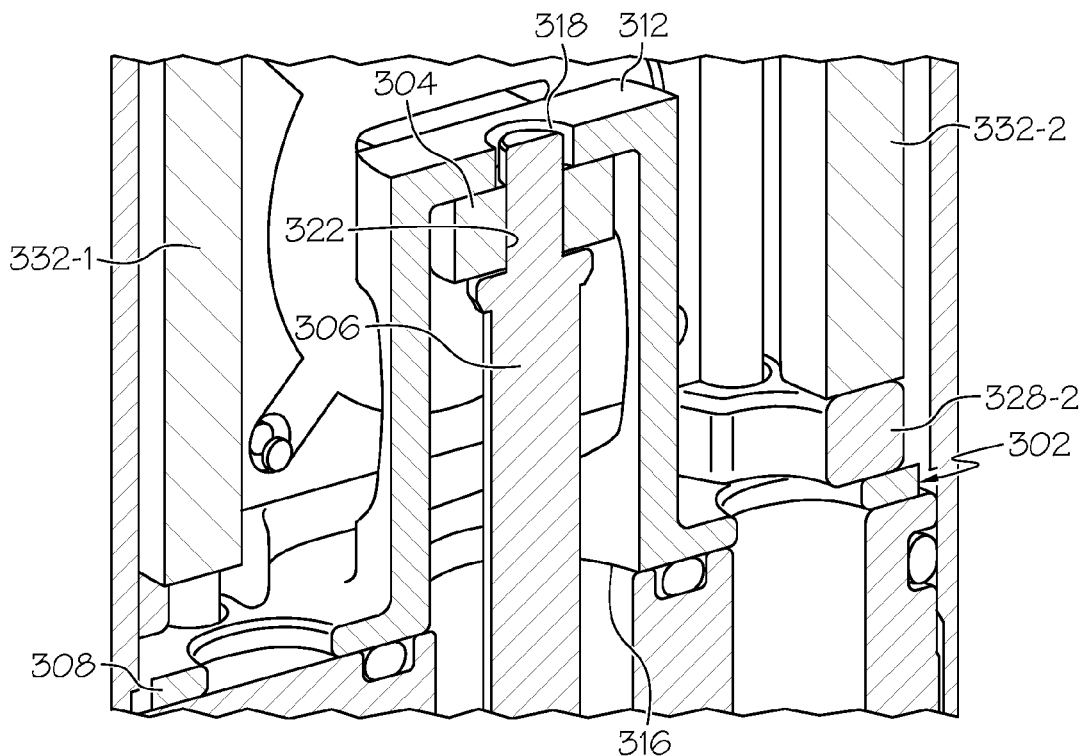
Figure 5:
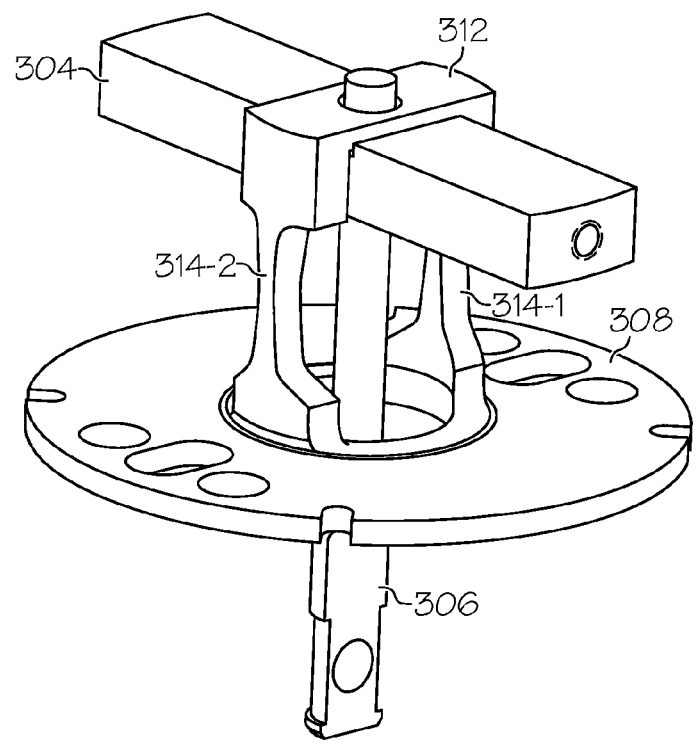
FIGS. 5 and 6 are plan and cross section views, respectively, of portions of the torque motor assembly depicted in FIGS. 3 and 4.
Figure 6:
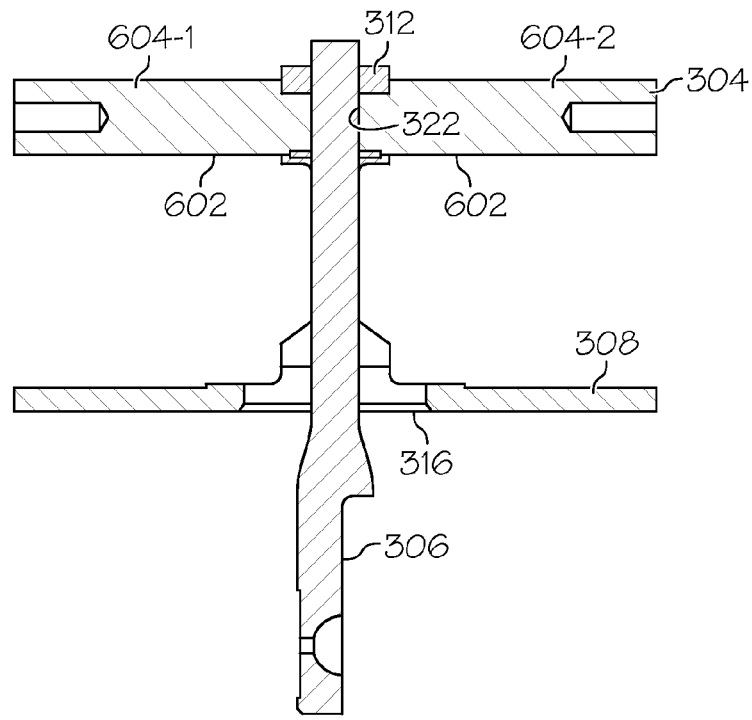
Figure 7:
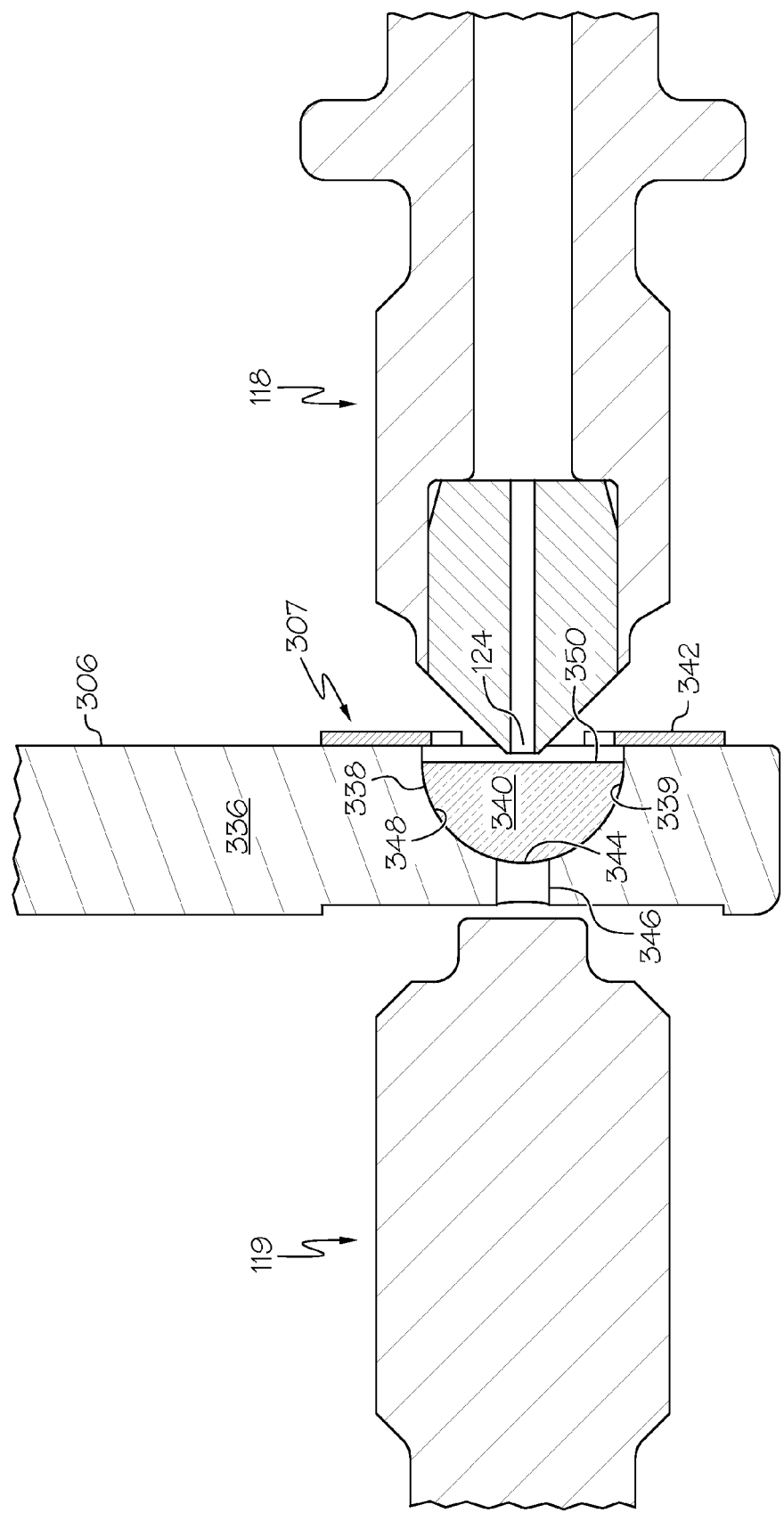
FIG. 7 is a close-up, cross-sectional plan view of a portion of the flapper assembly depicted in FIG. 1 according to exemplary embodiments of the present invention, the illustrated flapper assembly including a flapper (the upper end portion of the flapper not shown in FIG. 7) that extends between a pair of nozzles in a nozzle-flapper assembly.
Figure 8:
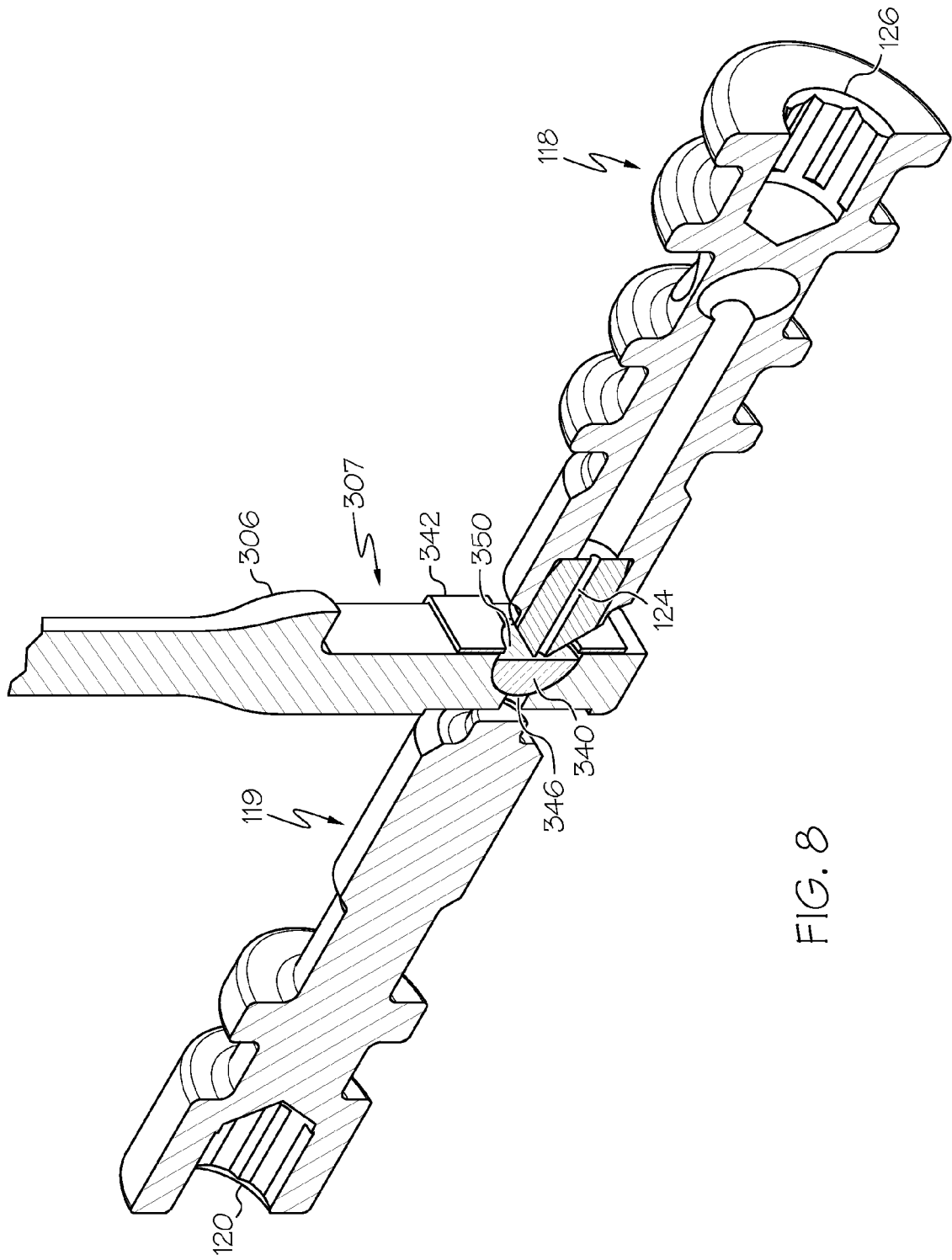
FIG. 8 is an isometric sectional view of the nozzle-flapper assembly of FIG. 7.
Figure 9:
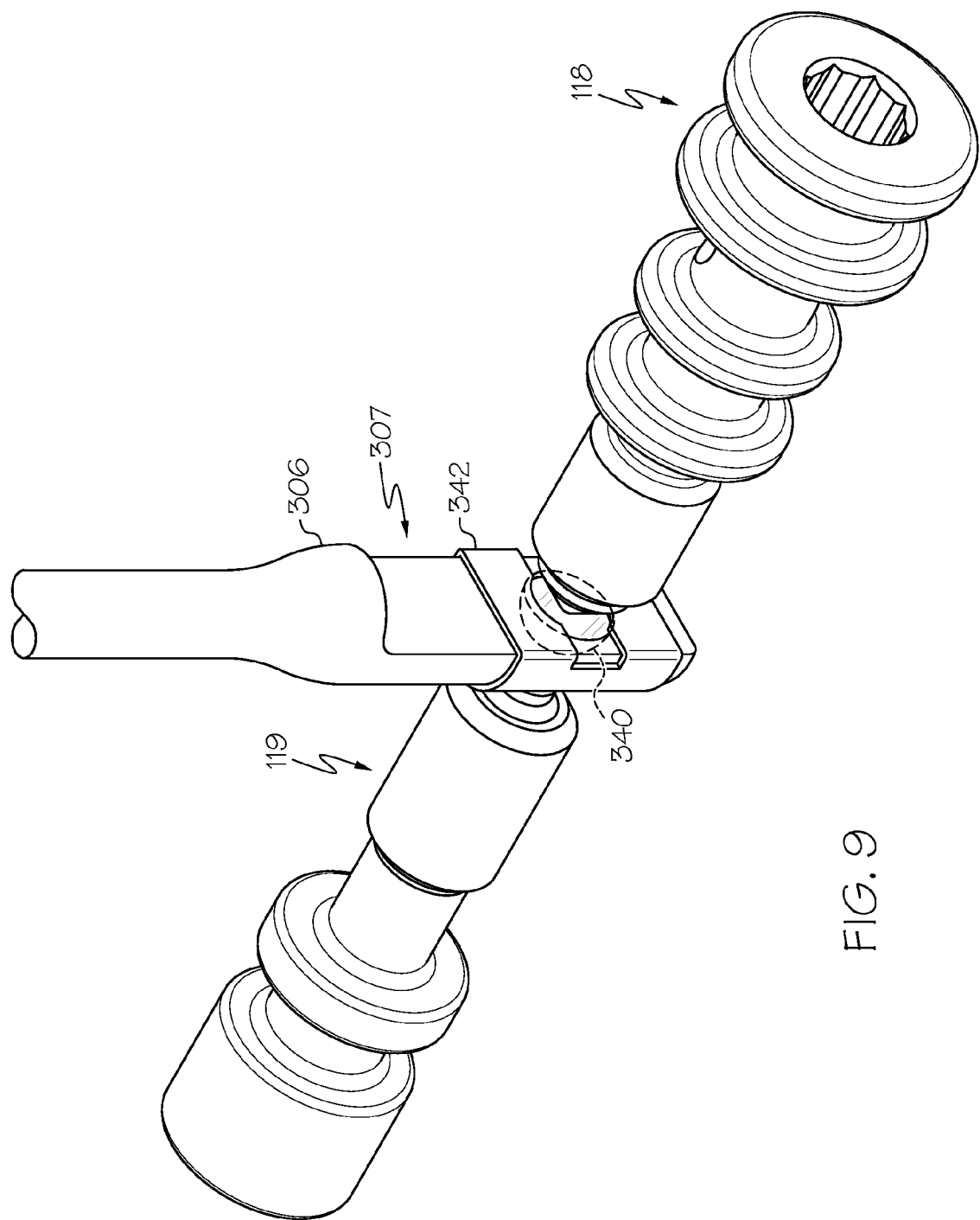
FIG. 9 is an isometric view of the nozzle-flapper assembly of FIGS. 7 and 8.

The depicted torque motor 104 additionally includes plurality of coils 326, a plurality of pole pieces 328, and a plurality of magnets 332 (see FIG. 4). The coils 326 (e.g., first coil 326-1 and second coil 326-2), the pole pieces 328 (e.g., first pole piece 328-1 and second pole piece 328-2), and the magnets 332 (e.g., first magnet 332-1 and second magnet 332-2) are all mounted on the armature support 302 in a well-known manner. When mounted, the first coil 326-1 surrounds a portion of the armature first arm 604-1, and the second coil 326-2 surrounds a portion of the armature second arm 604-2. The first pole piece 328-1 is disposed adjacent the first coil 326-1, and the second pole piece 328-2 is disposed adjacent the second coil 326-2. It will be appreciated that pole pieces 328, like the armature 304, are preferably formed of any one of numerous magnetically permeable materials.

The first magnet 332-1 is coupled between the first pole piece 328-1 and the second pole piece 328-2, and the second magnet 332-2 is spaced apart from the first magnet 332-1, and is also coupled between the first pole piece 328-1 and the second pole piece 328-2. The coils 326 are additionally configured to be coupled to a non-illustrated source of electrical current. As is generally known, the rotational position of the armature 304 can be controlled by controllably energizing the coils 326.

Figure 12:
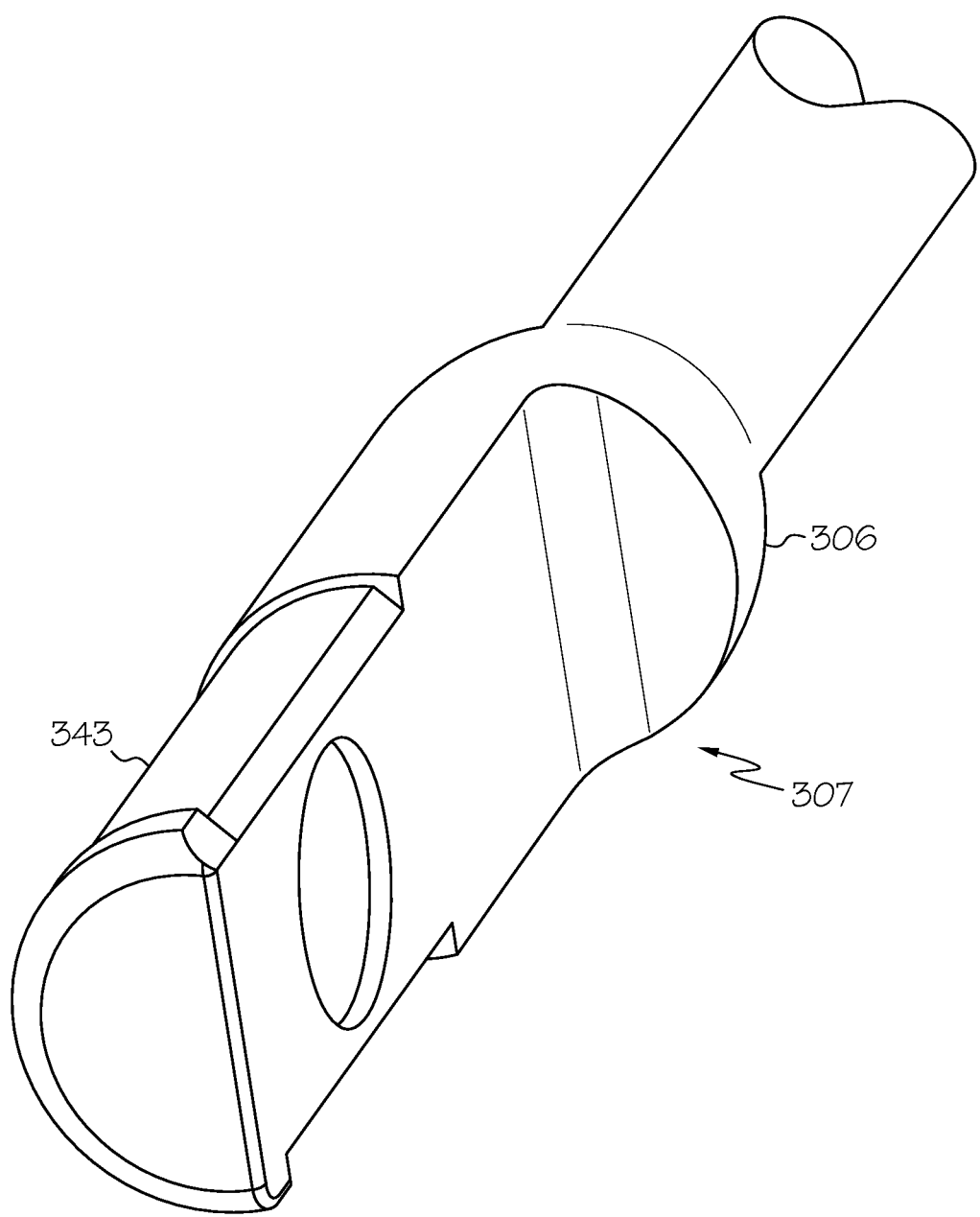
FIG. 12 is a perspective view of the lower end portion of flapper including a reduced diameter portion for receiving a retaining clip of the flapper assembly.

Still referring to FIG. 1 and now to FIGS. 7 through 11, in accordance with exemplary embodiments of the present invention, the flapper 306 is part of a flapper assembly 307 that will now be described in more detail. The flapper assembly 307 comprises the flapper 306 having an upper end portion 334 coupled to the armature-flapper support 312 and to the armature 304 as noted previously. A lower end portion 336 of the flapper 306 includes a concave surface 338 (FIGS. 1 and 7) defining a spherical socket 339 for receiving a hemispherical closure member 340, and a retaining clip 342 for retaining the hemispherical closure member 340 in the socket. The lower end portion of the flapper has a reduced diameter portion 343 (e.g., FIG. 12) defining a circumferential groove for receiving the retaining clip 342 as hereinafter described. The socket 339 has a contour substantially the same as the contour of the hemispherical closure member 340. The socket may include an opening 344 in the bottom thereof that is in fluid communication with a bore 346 through a rear portion of the flapper 306 to allow any leaking hydraulic fluid to escape the socket and to aid in machining the socket.

The hemispherical closure member 340 comprises a spherical surface 348 and an opposing flat diametrical face 350 (also referred to herein as "the sealing surface") configured for substantially concentric engagement with the nozzle outlet 124 when the electrohydraulic valve is in the closed (engine run) position. The hemispherical closure member is disposed in the socket for oscillatory movement therein with the spherical surface of the hemispherical closure member seated within the socket. The matching contours and close tolerance fit of the hemispherical closure member within the socket acts to help position the flat diametrical face 350 directly opposite the nozzle outlet for improved nozzle-flapper alignment.

The hemispherical closure member comprises sapphire, and more particularly comprises a sapphire hemispherical closure member. The use of sapphire for the hemispherical closure member is particularly useful in that the flat diametrical face of the sapphire hemispherical closure member having a very smooth surface may be manufactured, providing excellent sealing against the nozzle outlet. In addition, sapphire is extremely hard and wear-resistant such that the contacting surface of the sapphire hemispherical closure member is substantially wear-resistant, thereby resulting in longer life and less leakage over time. More particularly, as the sapphire hemisphere has an optically flat finish, any leakage that may occur actually decreases over time as the sapphire hemispherical closure member effectively burnishes the nozzle outlet. Sapphire is also substantially impervious to aircraft fluids and solvents and has a relatively high compressive strength of over 300 kilopound per square inch (ksi). The use of a sapphire hemispherical closure member also provides other advantages. Sapphire hemispheres that may be used as the sapphire hemispherical closure member are commercially available and are relatively inexpensive. Such sapphire hemispheres are conventionally used in optical applications. The spherical surface permits oscillatory movement (up to about 10 degrees in all directions) of the sapphire hemispherical closure member in the socket with very little friction.

The sapphire used for the sapphire hemispherical closure member comprises synthetic sapphire made from a boule of crystalline aluminum oxide ($Al_2O_3$). Synthetic sapphire has a value of 9 on the Mohs scale of mineral hardness. Synthetic sapphire is industrially produced from agglomerated aluminium oxide, sintered and fused in an inert atmosphere (hot isostatic pressing for example), yielding a transparent polycrystalline product, slightly porous, or with more traditional methods such as Verneuil, Czochralski, flux method, etc., yielding a single crystal sapphire material that is non-porous and should be relieved of its internal stress.

Figures 10, 11:
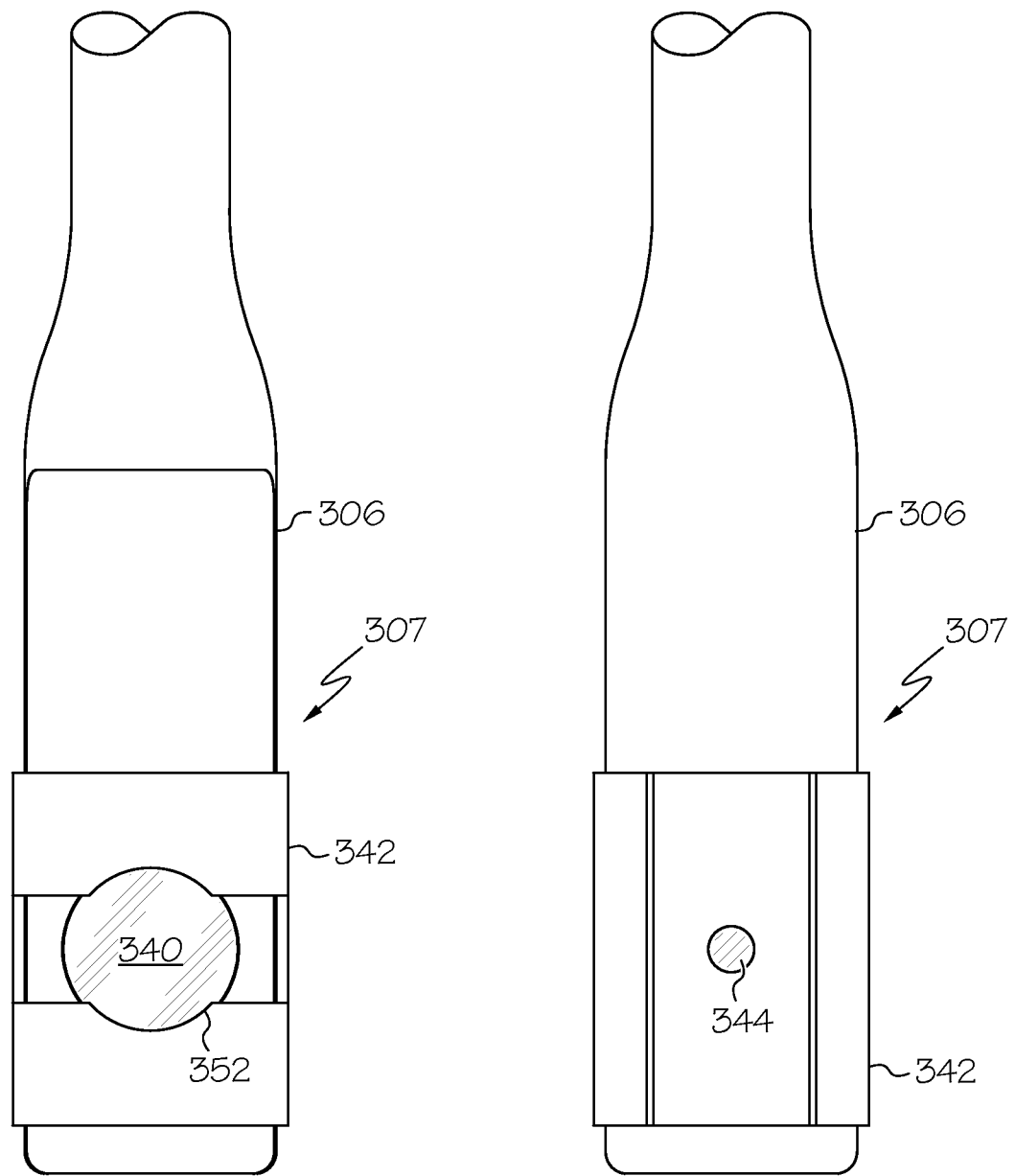
FIGS. 10 and 11 are respectively front and rear views of the flapper assembly in FIGS. 7 through 9 (the upper end portion of the flapper not shown)

The retaining clip 342 is slidably mounted over the lower end portion 336 of the flapper and is configured to retain the hemispherical closure member 340 in the socket 339 but allow oscillatory movement of the hemispherical closure member to align up against and seal the nozzle outlet. More particularly, the retaining clip 342 comprises an open-ended generally tubular body including a retention opening 352 in a front portion thereof and a gap 354 in rear portion thereof. When the retention opening 352 is aligned with the hemispherical closure member as depicted in FIG. 10, the flat diametrical surface 350 of the hemispherical closure member is exposed. The size of the retention opening 352 in the retaining clip is smaller than the size of the hemispherical closure member 340. This is to ensure that the hemispherical closure member cannot be dislodged from the socket while permitting oscillatory movement of the hemispherical closure member within the socket as noted above. The inner diameter of the retaining clip 342 is selected to be mateable with the reduced diameter portion 343 (FIG. 12) of the lower end portion of the flapper when disposed thereabout. Thus, the retaining clip 342 fits closely about the reduced diameter portion 343 of the flapper lower end portion, but is slidable relative to the flapper along the elongated length of the flapper in a sliding direction toward the armature during assembly. More specifically, the inner diameter of the retaining clip 342 is in interference fit with the reduced diameter portion 343. The retaining clip 342 flexes outwardly during assembly of the flapper assembly and closes inwardly as it enters the reduced diameter portion 343, thereby becoming trapped within the circumferential groove. As the lower end portion of the flapper has a reduced diameter portion, the retaining clip is slid up from the bottom of the flapper and snaps into place about the reduced diameter portion 343 (that defines the circumferential groove) of the lower end portion of the flapper. Once the retaining clip is fully in position in the circumferential groove (see FIG. 12), the spring force of the retaining clip locks the retaining clip 342 about the reduced diameter portion of the lower end portion of the flapper.

In operation, the plurality of coils 326 is controllably energized to control the rotational position of the armature 304. As noted previously, the flapper 306 of the flapper assembly 307 is coupled to the armature and armature-flapper support and extends between the outlets of each of the nozzles in the EHV. By controlling the rotational position of the armature, the position of the flapper relative to each of the nozzle outlets is controlled and thus fluid pressure and/or flow to the hydraulically controlled device is controlled. More particularly, when the coils are energized, the flapper moves toward the respective nozzle and the hemispherical closure member 340 oscillates/pivots toward and against the nozzle outlet. A seal is provided when the flat diametrical face (i.e., the sealing surface) 350 of the hemispherical closure member 340 is disposed against the nozzle outlet, thereby shutting off fluid flow. The EHV is in a closed (engine run) position when the flapper (more particularly, the sealing surface of the hemispherical closure member) is held against and engages the nozzle outlet. On loss of power, the sealing surface moves off the nozzle outlet to an open (engine stop) position, permitting flow of the hydraulic fluid to the hydraulically-controlled device (here, an engine). The term "engine run" refers to an "on" position and the term "engine stop" refers to an "off position" and the term "engine" is used generically to refer generally to any hydraulically-controlled device.

While the electrohydraulic valve comprising a shutoff valve is described, it is to be understood that the electrohydraulic valve as described may be used for non-shutoff applications, such as for fuel injection. In addition, while the flapper assembly has been described for the torque motor of the electrohydraulic valve described herein, it is to be understood that the flapper assembly may be used in torque motors and electrohydraulic valves having configurations other than that described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electrohydraulic valve comprising:
   a nozzle having a nozzle outlet; and
   a torque motor comprising a plurality of coils, an armature coupled to an armature-flapper support, and a flapper assembly comprising:
      a flapper having an upper end portion coupled to the armature and armature-flapper support, and having a lower end portion extending between the nozzle and a flapper stop, the lower end portion including a socket therein, the socket defining a concave surface having an opening in fluid communication with a bore defined through the lower end portion of the flapper;
      a hemispherical closure member disposed for oscillatory movement in the socket and having a flat diametrical face configured to engage the nozzle outlet when the electrohydraulic valve is in a closed position, the hemispherical closure member coupled to the concave surface of the socket; and
      a retaining clip slidably mounted over the lower end portion of the flapper for retaining the hemispherical closure member in the socket; and
   wherein the nozzle is configured to be in fluid communication with the flapper assembly when the electrohydraulic valve is in an open position.

2. The electrohydraulic valve of claim 1, wherein the torque motor is adapted to be selectively energized and configured, upon being selectively energized, to control the position of the flapper relative to the nozzle outlet, thereby controlling flow of pressurized hydraulic fluid to a hydraulically controlled device.

3. The electrohydraulic valve of claim 1, wherein the hemispherical closure member comprises a sapphire hemispherical closure member.

4. The electrohydraulic valve of claim 1, wherein the electrohydraulic valve comprises a shutoff valve.

5. The electrohydraulic valve of claim 1, wherein the lower end portion of the flapper includes a circumferential groove defined about a portion of a perimeter of the lower end of the flapper, the retaining clip comprises an open-ended tubular body that is received over the lower end portion of the flapper in the circumferential groove to lock the retaining clip in place about the lower end portion of the flapper, a retention opening in the open-ended tubular body to expose the flat diametrical face of the hemispherical closure member, and the retaining clip defines a retaining clip opening in fluid communication with the bore.

6. The electrohydraulic valve of claim 5, wherein the retention opening is selectively sized to retain the hemispherical closure member in the socket, a size of the retention opening being smaller than a size of the hemispherical closure member to prevent dislodgment thereof from the socket while permitting oscillatory movement thereof within the socket.

7. A torque motor comprising:
   an armature coupled to an armature-flapper support;
   a flapper assembly comprising:
      a flapper having an upper end portion coupled to the armature-flapper support and to the armature, and having a lower end portion extending between a nozzle and a flapper stop, the lower end portion including an open-bore concave socket defined within the lower end portion and a circumferential groove defined about a portion of the perimeter of the lower end portion;
      a hemispherical closure member disposed for oscillatory movement in the socket and having a flat diametrical face configured to engage a nozzle outlet of the nozzle when the electrohydraulic valve is in a closed (engine run) position; and
      a retaining clip slidably mounted over the lower end portion of the flapper and received in the circumferential groove for retaining the hemispherical closure member in the socket; and
   a plurality of coils, each coil surrounding a respective portion of the armature.

8. The torque motor of claim 7, wherein the hemispherical closure member comprises a sapphire hemispherical closure member.

9. The torque motor of claim 7, wherein the retaining clip comprises an open-ended tubular body that locks in place about the circumferential groove of the lower end portion of the flapper and the retaining clip includes a retention opening in the open-ended tubular body to expose the flat diametrical face of the hemispherical closure member.

10. The torque motor of claim 9, wherein the retention opening is selectively sized to retain the hemispherical closure member in the socket, a size of the retention opening being smaller than a size of the hemispherical closure member to prevent dislodgment thereof from the socket while permitting oscillatory movement thereof within the socket.

11. The torque motor of claim 7, wherein the torque motor is adapted to be selectively energized and configured, upon being selectively energized, to control the position of the flapper relative to the nozzle outlet, thereby controlling flow of pressurized hydraulic fluid to a hydraulically controlled device.

12. A flapper assembly for a torque motor of an electrohydraulic valve, the flapper assembly comprising:

a flapper having an upper end portion configured for coupling to an armature and armature-flapper support of the torque motor and a lower end portion having a socket therein, the socket defining a concave surface having an opening in fluid communication with a bore defined through the lower end portion of the flapper, the lower end portion of the flapper including a circumferential groove defined about a portion of a perimeter of the lower end of the flapper;

a hemispherical closure member disposed for oscillatory movement in the socket, the hemispherical closure member having a flat diametrical face configured to seal against a nozzle outlet, the hemispherical closure member coupled to the concave surface of the socket; and a retaining clip slidably mounted over the lower end portion of the flapper in the circumferential groove to lock the retaining clip to the lower end portion, the retaining clip surrounding the lower end portion and having a retention opening exposing the flat diametrical face and sized to retain the hemispherical closure member in the socket.

13. The flapper assembly of claim 12, wherein the flat diametrical face of the hemispherical closure member is configured for substantially concentric engagement with the nozzle outlet and a spherical surface configured for seating and oscillatory movement within the socket.

14. The flapper assembly of claim 12, wherein the hemispherical closure member comprises a sapphire hemispherical closure member.

15. The flapper assembly of claim 12, wherein the electrohydraulic valve comprises a shutoff valve.

16. The flapper assembly of claim 12, wherein the retention opening in the retaining clip has a size that is smaller than the size of the hemispherical closure member to prevent dislodgment thereof from the socket while permitting oscillatory movement thereof within the socket.

17. The flapper assembly of claim 12, wherein the retaining clip comprises an open-ended tubular body that is received over the lower end portion of the flapper in the circumferential groove to lock the retaining clip about the lower end portion of the flapper, and the retaining clip defines a retaining clip opening in fluid communication with the bore.

* * * * *